(12) United States Patent
Kobres et al.

(10) Patent No.: US 11,120,472 B2
(45) Date of Patent: Sep. 14, 2021

(54) TECHNIQUES FOR RETAIL LOCATION-AWARE SERVICES

(71) Applicant: NCR Corporation, Duluth, GA (US)

(72) Inventors: Erick Kobres, Lawrenceville, GA (US); Philip DiPietro, Johns Creek, GA (US)

(73) Assignee: NCR Corporation, Atlanta, GA (US)

( * ) Notice: Subject to any disclaimer, the term of this patent is extended or adjusted under 35 U.S.C. 154(b) by 212 days.

(21) Appl. No.: 13/955,628

(22) Filed: Jul. 31, 2013

(65) Prior Publication Data

US 2015/0039392 A1 Feb. 5, 2015

(51) Int. Cl.
*G06Q 30/02* (2012.01)
*G06Q 20/32* (2012.01)
*G06Q 50/00* (2012.01)

(52) U.S. Cl.
CPC ..... *G06Q 30/0261* (2013.01); *G06Q 20/3224* (2013.01); *G06Q 30/0201* (2013.01); *G06Q 30/0203* (2013.01); *G06Q 30/0281* (2013.01); *G06Q 50/01* (2013.01)

(58) Field of Classification Search
CPC ........ G06Q 30/0261; G06Q 20/03224; G06Q 30/0203; G06Q 50/01; G06Q 30/0201; G06Q 30/0281
See application file for complete search history.

(56) References Cited

U.S. PATENT DOCUMENTS

| | | | | |
|---|---|---|---|---|
| 7,637,426 B1* | 12/2009 | Green | ................... | G06Q 30/06 235/383 |
| 8,200,527 B1* | 6/2012 | Thompson | ......... | G06Q 10/0639 705/7.38 |
| 8,484,676 B1* | 7/2013 | Narsimhan | ........ | H04N 21/6543 725/34 |
| 8,866,673 B2* | 10/2014 | Mendelson | .......... | G01C 21/206 342/386 |
| 9,135,612 B1* | 9/2015 | Proctor, Jr. | .......... | G06Q 20/202 |
| 9,264,484 B1* | 2/2016 | Moxley | ................... | H04L 67/10 |
| 2003/0063779 A1* | 4/2003 | Wrigley | ................. | G06Q 30/02 382/116 |
| 2004/0249723 A1* | 12/2004 | Mayer | ................ | G06Q 30/0601 705/80 |
| 2004/0254837 A1* | 12/2004 | Roshkoff | ............. | G06Q 20/105 705/14.13 |
| 2007/0043651 A1* | 2/2007 | Xiao | .................... | G06Q 40/025 705/37 |

(Continued)

OTHER PUBLICATIONS

Sajal K. Das: "Mobile Handset Design", Apr. 19, 2010 (Apr. 19, 2010), Wiley, XP055150611 ISBN: 978-0-47-082467-2, pp. 204-207* p. 204-p. 205 *.

(Continued)

*Primary Examiner* — Matthew S Gart
*Assistant Examiner* — Stephen S Swartz
(74) *Attorney, Agent, or Firm* — Schwegman, Lundberg & Woessner

(57) ABSTRACT

Techniques for retail location-aware services are provided. A consumer defines parameters in which it is acceptable to the consumer to receive an offer for a good or service. When the parameters are achievable for an enterprise and when the consumer is in a configured proximity to the desired good or service, the mobile device of the consumer is notified of the offer.

10 Claims, 3 Drawing Sheets

(56) References Cited

U.S. PATENT DOCUMENTS

| | | | |
|---|---|---|---|
| 2007/0073593 A1* | 3/2007 | Perry | G06Q 30/0629 |
| | | | 705/26.64 |
| 2008/0082373 A1* | 4/2008 | Durocher | G06Q 10/02 |
| | | | 705/6 |
| 2008/0089288 A1* | 4/2008 | Anschutz | G06Q 30/02 |
| | | | 370/331 |
| 2008/0133126 A1* | 6/2008 | Dupray | G01S 5/0018 |
| | | | 701/408 |
| 2008/0238723 A1* | 10/2008 | Fein | G06Q 30/0244 |
| | | | 340/988 |
| 2008/0288889 A1* | 11/2008 | Hunt | G06Q 30/02 |
| | | | 715/810 |
| 2008/0294996 A1* | 11/2008 | Hunt | G06Q 30/02 |
| | | | 715/739 |
| 2009/0047937 A1* | 2/2009 | Zellner | H04L 63/0281 |
| | | | 455/414.1 |
| 2009/0254971 A1* | 10/2009 | Herz | G06Q 10/10 |
| | | | 726/1 |
| 2010/0061294 A1* | 3/2010 | Proctor, Jr. | G06Q 30/0623 |
| | | | 370/328 |
| 2010/0063867 A1* | 3/2010 | Proctor, Jr. | H04W 4/029 |
| | | | 455/414.1 |
| 2010/0250359 A1* | 9/2010 | Gillenson | G06Q 30/02 |
| | | | 705/14.25 |
| 2010/0262464 A1* | 10/2010 | Monteforte | G06Q 10/00 |
| | | | 705/7.29 |
| 2011/0040655 A1* | 2/2011 | Hendrickson | G06Q 30/02 |
| | | | 705/27.1 |
| 2011/0111738 A1* | 5/2011 | Jones | G06Q 30/02 |
| | | | 455/414.1 |
| 2011/0258049 A1* | 10/2011 | Ramer | G06F 17/30867 |
| | | | 705/14.66 |
| 2011/0295722 A1* | 12/2011 | Reisman | G06Q 30/0201 |
| | | | 705/27.1 |
| 2012/0036014 A1* | 2/2012 | Sunkada | G06Q 30/02 |
| | | | 705/14.54 |
| 2012/0166261 A1* | 6/2012 | Velusamy | G06Q 30/0214 |
| | | | 705/14.16 |
| 2012/0253908 A1* | 10/2012 | Ouimet | G06Q 30/02 |
| | | | 705/14.23 |
| 2012/0259722 A1* | 10/2012 | Mikurak | G06Q 10/087 |
| | | | 705/26.1 |
| 2012/0310750 A1* | 12/2012 | Schutzbank | G06Q 30/02 |
| | | | 705/14.72 |
| 2013/0054375 A1* | 2/2013 | Sy | G06Q 30/02 |
| | | | 705/14.66 |
| 2013/0073366 A1* | 3/2013 | Heath | G06Q 30/0259 |
| | | | 705/14.25 |
| 2013/0080289 A1* | 3/2013 | Roy | G06Q 30/06 |
| | | | 705/26.8 |
| 2013/0091130 A1* | 4/2013 | Barrow | G06F 17/30699 |
| | | | 707/723 |
| 2013/0117151 A1* | 5/2013 | Macaisa | G06Q 30/0633 |
| | | | 705/26.8 |
| 2013/0132431 A1* | 5/2013 | Platt | G06F 17/30241 |
| | | | 707/770 |
| 2013/0210461 A1* | 8/2013 | Moldavsky | G06Q 30/0261 |
| | | | 455/456.3 |
| 2013/0211944 A1* | 8/2013 | Momin | G06Q 30/02 |
| | | | 705/26.2 |
| 2013/0217333 A1* | 8/2013 | Sprigg | H04W 4/008 |
| | | | 455/41.2 |
| 2013/0246934 A1* | 9/2013 | Wade | G06F 3/04842 |
| | | | 715/745 |
| 2013/0282438 A1* | 10/2013 | Hunter | G01S 1/02 |
| | | | 705/7.32 |
| 2013/0282455 A1* | 10/2013 | Houseworth | G06Q 50/01 |
| | | | 705/14.16 |
| 2013/0325550 A1* | 12/2013 | Varghese | H04W 4/21 |
| | | | 705/7.31 |
| 2013/0332219 A1* | 12/2013 | Clark | G06Q 30/02 |
| | | | 705/7.19 |
| 2014/0006131 A1* | 1/2014 | Causey | G06Q 10/0875 |
| | | | 705/14.24 |
| 2014/0040004 A1* | 2/2014 | Hamo | G06Q 30/06 |
| | | | 705/14.35 |
| 2014/0095285 A1* | 4/2014 | Wadell | G06Q 30/00 |
| | | | 705/14.25 |

OTHER PUBLICATIONS

Geir M. Koien: "Entity Authentication and Personal Privacy in Future Cellular Systems", Oct. 5, 2009 (Oct. 5, 2009), River Publishers, XP055150699, ISBN: 978-8-79-232932-5, pp. 16-20,* p. 18-p. 19 *.

Wikipedia: "Location-based service", Internet Article, Jun. 21, 2013 (Jun. 21, 2013), XP055150612, Retrieved from the Internet: URL:http://en.wikipedia.org/w/index.php?title=Location-based_service&oldid=560861654 [retrieved on Nov. 4, 2014] * the whole document *.

Wikipedia: "Mobile Device", Internet Article, Jul. 23, 2013 (Jul. 23, 2013), XP055150670, Retrieved from the Internet: URL:http://en.wikipedia.org/w/index.php?title=Mobile_device&oldid=565491831 [retrieved on Nov. 4, 2014] * the whole document *.

D1: Philip J. Windley: "The Live Web:Building Event-Based Connections in the Cloud", Dec. 21, 2011 (Dec. 21, 2011), Course Technology PTR, XP055258627, ISBN: 978-1-133-68668-2 pp. ToC,Ch01-Ch02,Ch10.

D2: Maximiliano Firtman: "Programming the Mobile Web 1st Edition", Aug. 2, 2010 (Aug. 2, 2010), O'Reilly, XP055277085, ISBN: 978-0-596-80778-8 pp. toC,369-274,Ind,.

D4: Wikipedia: "Mobile Web", Internet Article, Jul. 23, 2013 (Jul. 23, 2013), XP055278147, Retrieved from the Internet: URL: https://en.wikipedia.org/w/index.php?title=Mobile_Web&oldid=565502330 [retrieved on Jun. 6, 2016].

D6: Wikipedia: "Point of sale", Internet Article, Jul. 15, 2013 (Jul. 15, 2013), XP055278169, Retrieved from the Internet: URL: https://en.wikipedia.org/w/index.php title=Point_of_sale&oldid=564375803 [retrieved on Jun. 6, 2016].

D7: Wikipedia: "Proximity marketing", Internet Article, Apr. 14, 2013 (Apr. 14, 2013), XP055278222, Retrieved from the Internet: URL: https://en.wikipedia.org/w/index.php?title=Proximity_marketing&oldid=550308219 [retrieved on Jun. 7, 2016].

D8: Seaugyeop Han et al: "A Study of Third-Party Tracking by Mobile Apps in the Wild", University of Washington Technical Report, Mar. 8, 2012 (Mar. 8, 2012), XP055277693, Retrieved from the Internet: URL: ftp://ftp.cs.washington.edu/tr/2012/03/UW-CSE-12-03-01.PDF [retrieved on Jun. 3, 2016].

European Office Action issued in copending European Patent Application 14173156.2 dated Jun. 13, 2016.

* cited by examiner

TECHNIQUES FOR RETAIL LOCATION-AWARE SERVICES

BACKGROUND

Automation for goods and services has reached record levels in society. Examples are everywhere from online banking and purchasing to a wide-range of devices and physical appliances that include computing and networking capabilities, which were just wishful dreams only a decade ago.

In fact, businesses are increasingly trying to reach consumers in real time and while the consumers are in the mood to make a purchase or in a location where a purchase is more likely.

Proximity (location-aware) notifications through a mobile communication channel are a known opportunity for retailers to interact with their customers. Location-based alerts within mobile apps, Passbook™, and similar systems can notify consumers when they are within proximity of a particular establishment. Unfortunately, retailers don't have a good way to tell what the consumer might be shopping for; even whether they are available to shop; what they would consider to be a deal good enough to get them into the store, etc.

Aside from traditional store browsing, consumers do not have an easy way to determine whether a store has items they are interested in purchasing. In some cases the store may have store inventory availability online, but that is not a good experience on a mobile device. Although a consumer may be able to do some online comparison shopping, it's not conducive to a shopping trip, and often online prices vary from in-store prices. In addition, only consumers really know what they would consider to be a good deal for an item (good or service).

Lastly, there are many existing promotional systems such as GOGGLE NOW™, FACEBOOK™, FOURSQUARE™, INTEL AIM™, and other systems that quietly gather information from and about consumers to try to infer what offers might resonate with the consumers. Unfortunately, the consumer has little control over the conclusions drawn by these systems. To the system, the consumer is just a pattern—and hopefully the system can find a good algorithmic match for the information collected about the consumer, such that the system makes a fairly decent prediction about the consumer; otherwise such systems are not worth a whole lot to the consumer.

SUMMARY

In various embodiments, techniques for retail location aware services are presented. According to an embodiment, a method for a location-aware service is provided. Specifically.

DETAILED DESCRIPTION

Figure 1:
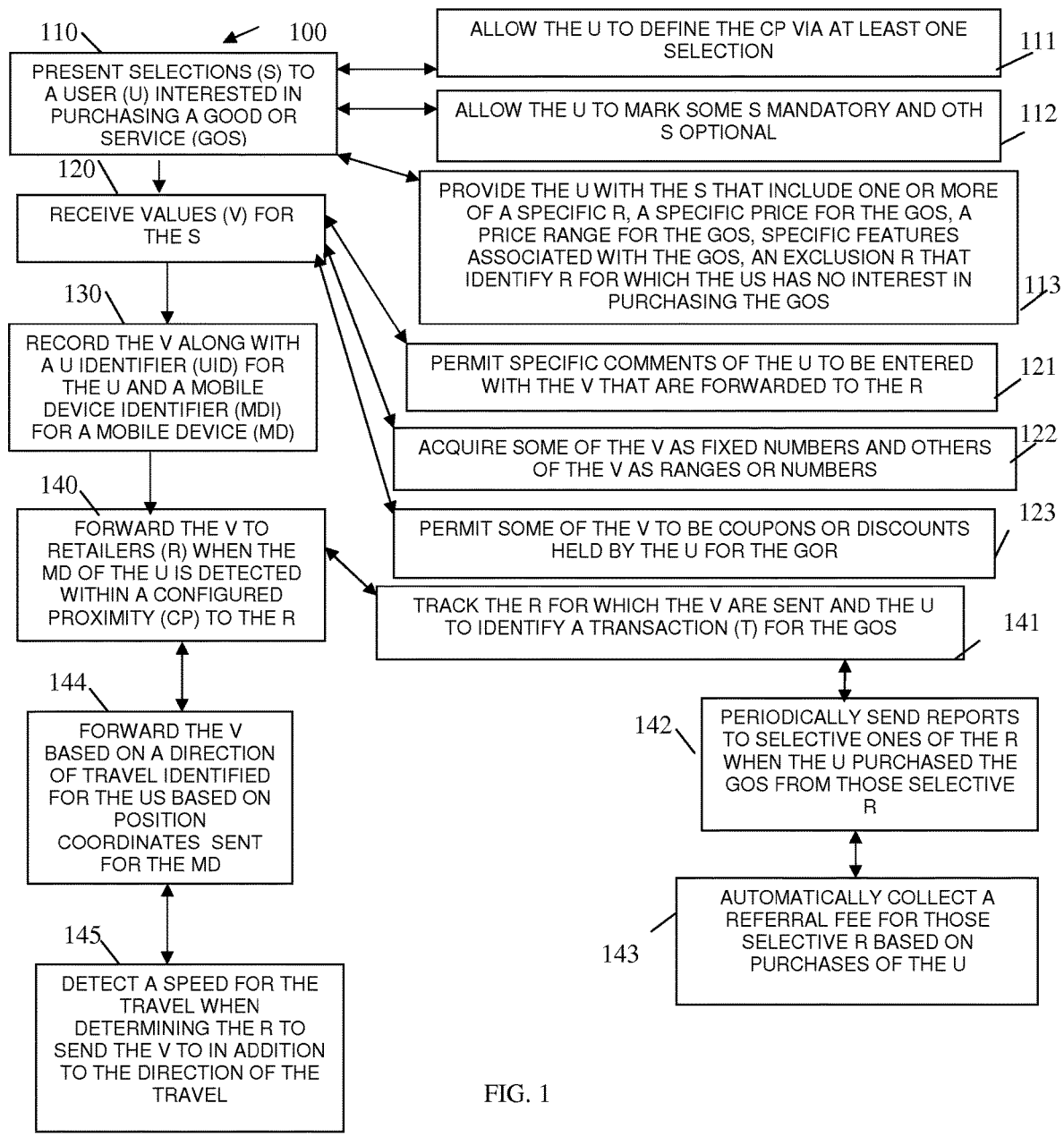
FIG. 1 is a diagram of a method for a location-aware service, according to an example embodiment.

FIG. 1 is a diagram of a method 100 for a location-aware service, according to an example embodiment. The method 100 (hereinafter "retail service") is implemented as instructions programmed and residing within memory and/or a non-transitory computer-readable (processor-readable) storage medium and executed by one or more processors. The processors are specifically configured and programmed to process the mobile payment manager. The retail service operates over a network. The network is wired, wireless, or a combination of wired and wireless.

In an embodiment, the retail service processes on processors of a server of cloud processing environment. In some instances, the mobile payment manager processes on a Point-Of-Sale (POS) terminal of a retailer (such as a restaurant, department store, and the like). The POS terminal can be, in some embodiments, a thin client that interacts with a remote server having the retail service. Moreover, the retail service can process on a Virtual Machine (VM) where the underlying physical processing environment and physical processors can vary depending upon the installation of the VM. In still other cases, the retail service operates on a client-based POS terminal.

Some initial context is presented with respect to the retail service and a client-based app described below with reference to the FIG. 2.

The techniques herein describe mechanisms to make retail location-aware mobile solutions that take advantage of big/fast data to ensure only valuable proximity alerts are presented to the consumer—and to ensure that retailers are able to intelligently interact with their nearby consumers.

The described approaches seek to use proximity and access to big/fast data to create real-time proximity-sensitive notifications to consumers for opted-in deals they actually care about. So, the customer "declares" that they are interested in purchasing a specific item—either through liking it on a social network, adding it to a wish list, or otherwise expressing an interest in the item. Essentially, they are saying they intend to "showroom" the item locally, but they are prepared to make the purchase online if available. Depending upon whether the relationship is: with a retailer through their loyalty program, or with a mobile wallet provider or bank—the customer uses his/her account to "dial in" preferences for the liked item—a purchase timeframe, a size/color preference, what he/she would consider a compelling price, whether he/she would entertain a counter-offer, whether he/she would notify friends of a purchase in exchange for a discount, etc.

When the consumer signs into his/her account, he/she has the option to "shop" his/her items of interest and then specifies the particulars of a desired purchase.

When the consumer later moves into proximity of a store with the ability to fulfill the declaration, and all of the criteria match (or a consumer-defined percentage match), the customer is notified that they have received an offer that meets his/her criteria. (The consumer is in control—if not all of the criteria match (or not his/her predefined percentage), he/she will not be notified.)

Several things may happen before the customer is notified (in some embodiments).

1. The retailer was notified that a consumer looking for an item the retailer can fulfill is in the retailer's geographical area (defined proximity). (No personally identifiable information has to be shared with the retailer.)

2. The retailer was notified of the parameters the consumer was willing to accept.

3. The retailer was able to price-check against ecommerce merchants to determine how to match or counter an online competitive offer.

4. The retailer creates an offer that matches the consumer's preferences.

Had the retailer been unable to meet all of the consumer's criteria (or consumer defined percentage of the criteria), no alert would have been triggered for the consumer.

This solution allows a consumer to unambiguously declare that they are looking for something specific, and only notifies them if their criteria can be met in a manner defined by the consumer.

This solution gives retailers a powerful way to combat "show rooming," enabling an opportunity to compete for the consumer's business.

Both consumers and merchants benefit based on their mutual acceptance of a set of criteria.

Likewise, "bad actors" are quickly dismissed on both counts: unrealistic customers will not receive offers and merchants with a non-competitive price structure will not have the opportunity to market to these customers.

At 110, the retail service presents selections to a user for defining under what circumstances the user is interested in purchasing a good or service. This can be a website interface or this can be an interface presented within an app (mobile application) within a user's mobile device (discussed below with respect to the FIG. 2 below).

In an embodiment, at 111, the retail service allows the user to define the configured proximity (discussed below with reference to the processing at 140) via at least one of the selections.

According to an embodiment, at 112, the retail service allows the user to mark some selections mandatory and other selections optional. That is, some selections can be optional and not needed but can increase a weight associated with whether the user is interested in the product while other selections can be defined by the user as mandatory meaning they are necessary for the user to be interested in the good or service.

In another case, at 113, the retail service provides the user with the selection that include one or more options for: a specific retailer, a specific price for the good or service, a price range for the good or service, specific features associated with the good or service, and exclusion retailers that identify retailers for which the user has no interest in purchasing the good or service.

At 120, the retail service receives values for the selections. The user determines what values are to be used for each selection and as stated above, in some embodiments, the user can make some values optional and others mandatory.

In an embodiment, at 121, the retail service permits specific comments of the user to be entered with the values that are forwarded to the retailers. This can allow a retailer to qualitatively evaluate what a user is interested in when the user feels the selections do not adequately capture what it is the user is interested in.

In still another situation, at 122, the retail service acquires some of the numbers as fixed numbers and others of the values as ranges of numbers. So, a range or specific value can be set by the consumer.

In an embodiment, at 123, the retail service permits some values to be coupons or discounts held by the user for the good or service.

At 130, the retail service records the values along with a user identifier for the user and a mobile device identifier for a mobile device of the user.

At 140, the retail service forwards the values to retailers when the mobile device of the user is directed within a configured proximity to the retailers.

According to an embodiment, at 141, the retail service tracks the retailers for which the values are sent and the user to identify a transaction for the good or the service.

Continuing with the embodiment of 141 and at 142, the retail service periodically sends reports to selective ones of the retailers when the user purchased the good or service from those selective retailers.

Still continuing with the embodiment of 142 and at 143, the retail service automatically collects a referral fee from those selective retailers based on purchases of the user.

In an embodiment, at 144, the retail service forwards the values based on direction of travel identified for the user base on position coordinates sent for the mobile device.

Continuing with the embodiment of 144 and at 145, the retail service detects a speed for the travel when determining the retailers to send the values to in addition to the direction of the travel.

Figure 2:
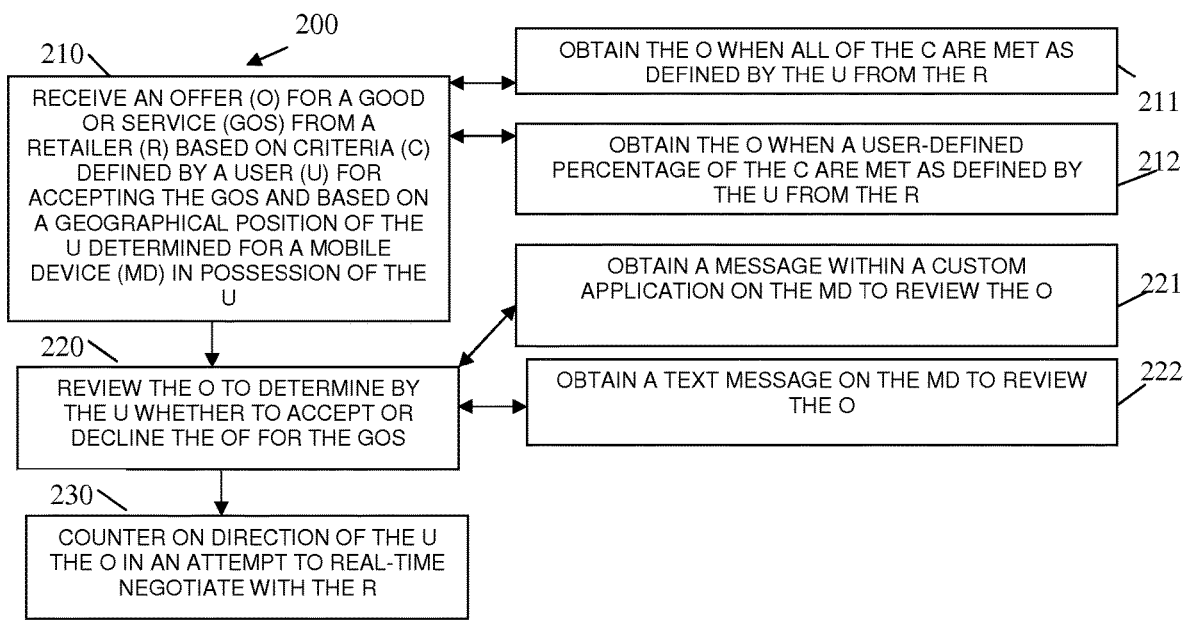
FIG. 2 is a diagram of another method for a location-aware service, according to an example embodiment.

FIG. 2 is a diagram of another method 200 for a location-aware service, according to an example embodiment. The method 200 (hereinafter "client-based app") is implemented as instruction and programmed within memory and/or a non-transitory computer-readable (processor-readable) storage medium that executes on one or more processors of a mobile device; the processors of the mobile device are specifically configured to execute the client-based app. The client-based app is operational over a network; the network is wired, wireless, or a combination of wired and wireless.

Whereas the retail service (the FIG. 1 above) describes processing (for the most part) associated a retailer's system (server, POS terminal, etc.), the client-based app describes processing from a client/consumer's mobile device (smartphone, laptop, tablet, wearable device, etc.). The client-based app interacts with the server or remote processer having the retail service, described in detail above with respect to the FIG. 1.

At 210, the client-based app receives an offer for a good or service from a retailer based on criteria defined by a user for accepting the good or service and based on a geographic position of the user determined for a mobile device in possession of the user.

According to an embodiment, at 211, the client-based app obtains the offer when all of the criteria are met as defined by the user from the retailer.

In another case, at 212, the client-based app obtains the offer when a user-defined percentage of the criteria are met as defined by the user from the retailer.

At 220, the client-based app reviews the offer to determine by the user whether to accept or decline the offer for the good or the service.

In an embodiment, at 221, the client-based app obtains a message within a custom application on the mobile device to review the offer.

In an alternative case, at 222, the client-based app obtains a text message on the mobile device to review the offer.

According to an embodiment, at 230, the client-based app counters based on a direction of the user the offer in an attempt to real-time negotiate with the retailer.

Figure 3:
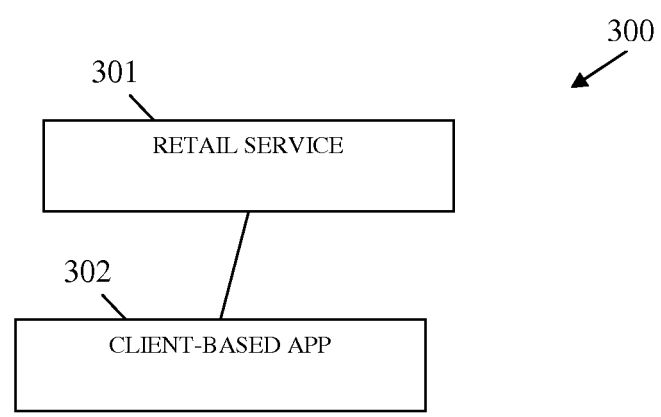
FIG. 3 is a diagram of a location-aware system, according to an example embodiment.

FIG. 3 is a diagram of a location-aware system 300, according to an example embodiment. The components of the location-aware system 300 are programmed and resided within memory and/or a non-transitory computer-readable medium and execute on one or more processors of one or more devices. The location-aware system 300 is operational over a network and the network can be wired, wireless, or a combination of wired and wireless.

The location-aware system 300 includes a retail service 301 and a client-based app 302. Each of these will be discussed in turn.

The location-aware system 300 includes a server or cloud processing environment having the retail service 301 programmed within memory and/or a non-transitory computer-readable storage media as executable instructions. The server or cloud processing environment executes the retail service 301. Example processing associated with the retail service 301 was presented above in detail with reference to the FIG. 1.

The retail service 301 is configured to register selections for criteria that defines when a user may accept an offer for a good or service based on a current geographic position of the user, and the retail service 301 communicates the criteria to retailers supplying the good or service based on the current geographic position of the user as determined from the mobile device.

The location-aware system 300 includes a mobile device having the client-based app 302 programmed within memory and/or a non-transitory computer-readable storage media as executable instructions. The mobile device (phone, laptop, tablet, wearable device, etc.) executes the client-based app 302. Example processing associated with the client-based app 302 was presented above in detail with reference to the FIG. 2.

The client-based app 302 is configured to receive real-time offers from the retailers for review on the mobile device based on satisfaction of the criteria and based on the current geographic position of the mobile device.

According to an embodiment, the mobile device is one of: a smartphone, a laptop, a tablet, and a wearable device.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The Abstract is provided to comply with 37 C.F.R. § 1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method, comprising:
   identifying, by executable instructions executing on a hardware processor from a non-transitory computer-readable storage medium as a retail service, a good liked by a user on a social network;
   presenting, by executable instructions selections to the user within an interface for defining under what set of circumstances the user is interested in purchasing the good, and wherein presenting further includes providing the user with the selections that include: specific retailers, a price range for the good, specific features associated with the good, and exclusion retailers that identify retailers for which the user has no interest in purchasing the good, and wherein at least one of the specific features comprises an indication as to whether the user would notify friends of the user of any subsequent made purchase of the good in exchange for a discount, wherein presenting further includes allowing the user to mark some selections mandatory and other selections optional, and wherein presenting further includes weighting the selections identified as optional;
   receiving, by the retail service, values for the selections from the interface, wherein receiving further includes associating the user with the selections as a particular consumer that is interested in showrooming the good at retail locations associated with the specific retailers but willing to purchase the product from the specific retailers when the specific features and the price range are within a consumer-defined percentage match to corresponding features and price range provided by any of those specific retailers, wherein the consumer-defined percentage match comprising a calculated percentage match of the selections identified as mandatory and the selections that are weighted and identified as optional by the user against against the corresponding features and the price ranges offered for the good by the specific retailers;
   recording, by the retail service, the values along with a user identifier for the user and a mobile device identifier for a mobile device of the user, wherein the device is the mobile device;
   detecting, by the retail service, the mobile device of the user within a configured proximity to the retailers based on coordinates tracked by the retail service;
   forwarding, by the retail service, the values to systems of retailers based on the detecting of the mobile device within the configured proximity, and wherein forwarding further includes excluding from the values the user identifier and any personally identifiable information associated with the user when forwarding the values to the systems of the retailers and avoiding sharing any of the personally identifiable information associated with the user with the systems of the retailers when forwarding the values; and
   providing, by the retail service, a proximity-based alert on the mobile device when any of the retailers located within the configured proximity indicate that the set of circumstances associated with the values are acceptable for the good or the service and those retailers provide offers for the good or the service.

2. The method of claim 1, wherein presenting further includes allowing the user to define the configured proximity via at least one selection.

3. The method of claim 1, wherein receiving further includes permitting specific comments of the user to be entered with the values that are forwarded to the retailers.

4. The method of claim 1, wherein receiving further includes acquiring some of the values as fixed numbers and others of the values as ranges of numbers.

5. The method of claim 1, wherein receiving further includes permitting some of the values to be coupons or discounts held by the user for the good.

6. The method of claim 1, wherein forwarding further includes tracking the retailers for which the values are sent and the user to identify a transaction for the good or the service.

7. The method of claim 6, wherein tracking further includes periodically sending reports to selective ones of the retailers when the user purchased the good or the service from those selective retailers.

8. The method of claim 7, wherein periodically sending further includes automatically collecting a referral fee from those selective retailers based on purchases of the user.

9. The method of claim 1, wherein forwarding further includes forwarding the values based on a direction of travel identified for the user based on position coordinates sent for the mobile device.

10. The method of claim 9, wherein forwarding further includes detecting a speed for the travel when determining the retailers to send the values to in addition to the direction of the travel.

* * * * *